United States Patent
Horst

(10) Patent No.: US 10,534,204 B2
(45) Date of Patent: Jan. 14, 2020

(54) STRUCTURED PHOTOREFRACTIVE LAYER STACK

(71) Applicant: International Business Machines Corporation, Armonk, NY (US)

(72) Inventor: Folkert Horst, Wettingen (CH)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 15/802,757

(22) Filed: Nov. 3, 2017

(65) Prior Publication Data

US 2019/0137792 A1 May 9, 2019

(51) Int. Cl.
 *G02F 1/03* (2006.01)
 *G02F 1/01* (2006.01)
 *G02F 1/015* (2006.01)

(52) U.S. Cl.
 CPC ............ *G02F 1/0118* (2013.01); *G02F 1/015* (2013.01); *G02F 2001/0154* (2013.01)

(58) Field of Classification Search
 CPC .................. G02F 1/0118; G02F 1/015; G02F 2001/0154; G02F 1/0338; G02F 1/0305
 See application file for complete search history.

(56) References Cited

U.S. PATENT DOCUMENTS

| 6,396,083 B1 * | 5/2002 | Ortiz ...................... B82Y 20/00 257/94 |
| 2007/0254490 A1 | 11/2007 | Jain | |
| 2015/0227019 A1 | 8/2015 | Tsutsumi et al. | |
| 2016/0202592 A1 | 7/2016 | Hollis et al. | |
| 2018/0164654 A1 | 6/2018 | Ogiso et al. | |

FOREIGN PATENT DOCUMENTS

| CN | 101882623 B | 7/2011 |
| JP | 2016048368 A | 4/2016 |
| WO | 2013075050 A1 | 5/2013 |

OTHER PUBLICATIONS

Guddala et al., "Synthesis and Optical Characterization of Photorefractive Inverse Opal Structures," 2012 International Conference on Fiber Optics and Photonics (Photonics), 2012, 3 pages. DOI: 10.1364/PHOTONICS.2012.W1B.5.

Wichtowski et al., "On mobility-lifetime products in photorefractive GaAs—AlGaAs quantum wells structures determined by moving grating technique measurements," Photonics Letters of Poland, vol. 6 (4), 2014, pp. 145-147. DOI: 1034302/plp.2014.4.11.

(Continued)

Primary Examiner — Joseph P Martinez
(74) Attorney, Agent, or Firm — James L. Olsen

(57) ABSTRACT

Aspects of the present disclosure are directed to a photorefractive layer stack. A plurality of layers are stacked along in a stacking direction and designed so as to enable a photorefractive response. That is, a refractive index of the plurality of layers modulates in response to illuminating the plurality of layers with an optical pattern of modulated intensity. A plurality of electrically insulated areas are arranged in a plane perpendicular to the stacking direction. The plurality of electrically insulated areas are optically homogenous and prevent lateral diffusion between any two electrically insulated areas of the plurality of electrically insulated areas.

20 Claims, 4 Drawing Sheets

(56) References Cited

OTHER PUBLICATIONS

Ziolkowski, A., "Temporal analysis of solitons in photorefractive semiconductors," Journal of Optics, vol. 14, No. 3, Feb. 2, 2012. (Abstract).
Le Corre et al., "Photorefractive multiple quantum well device using quantum dots as trapping zones," Applied Physics Letters, vol. 70, No. 12, Mar. 1997, pp. 1575-1577. http://dx.doi.org/10.1063/1.118621.
Nolte et al., "High-density optical storage based on nanometer-size arsenic clusters in low-temperature-growth GaAs," Applied Physics Letters, vol. 61, No. 26, Dec. 1992, pp. 3098-3100. http://dx.doi.org/10.1063/1.107973.
Partovi et al., "Cr-doped GaAs/AlGaAs semi-insulating multiple quantum well photorefractive devices," Applied Physics Letters, vol. 62, No. 5, Feb. 1993, pp. 464-466 http://dx.doi.org/10.1063/1.108934.

\* cited by examiner

10,534,204 B2

STRUCTURED PHOTOREFRACTIVE LAYER STACK

BACKGROUND

Aspects of the present disclosure relate generally to the field of photorefractive layer stacks, electro-optical devices comprising such layer stacks, and methods of operation thereof.

A photorefractive layer stack typically comprises stacked layers of semiconductor materials designed to enable a photorefractive response (e.g., a modulation of the refractive index of the stack occurs in response to illuminating the stack with an optical pattern of modulated intensity). For example, in a bulk photorefractive material, refractive index gratings can be generated by illuminating the material by two coherent plane light waves under different angles. Due to interference, a periodic pattern of bright and dark stripes can be formed in the material. In the bright areas, light is absorbed and excites charge carriers. The (most) mobile carriers (electrons) diffuse to the dark areas where they are trapped. Thus, in the dark areas an excess negative charge builds up, while in the bright areas an excess positive charge remains. The electric-field pattern that results from this non-uniform charge distribution causes, in turn, a modulation of refractive index, owing to the electro-optic Pockels effect.

SUMMARY

Aspects of the present disclosure are directed to a photorefractive layer stack. A plurality of layers are stacked along in a stacking direction and designed so as to enable a photorefractive response. That is, a refractive index of the plurality of layers modulates in response to illuminating the plurality of layers with an optical pattern of modulated intensity. A plurality of electrically insulated areas are arranged in a plane perpendicular to the stacking direction. The plurality of electrically insulated areas are optically homogenous and prevent lateral diffusion between any two electrically insulated areas of the plurality of electrically insulated areas.

The above summary is not intended to describe each illustrated embodiment or every implementation of the present disclosure.

BRIEF DESCRIPTION OF THE DRAWINGS

FIG. 4 depicts a lattice of columnar areas, FIG. 5 depicts a lattice of square areas, and FIG. 6 depicts a distorted lattice, in accordance with embodiments of the present disclosure.

Figure 1:
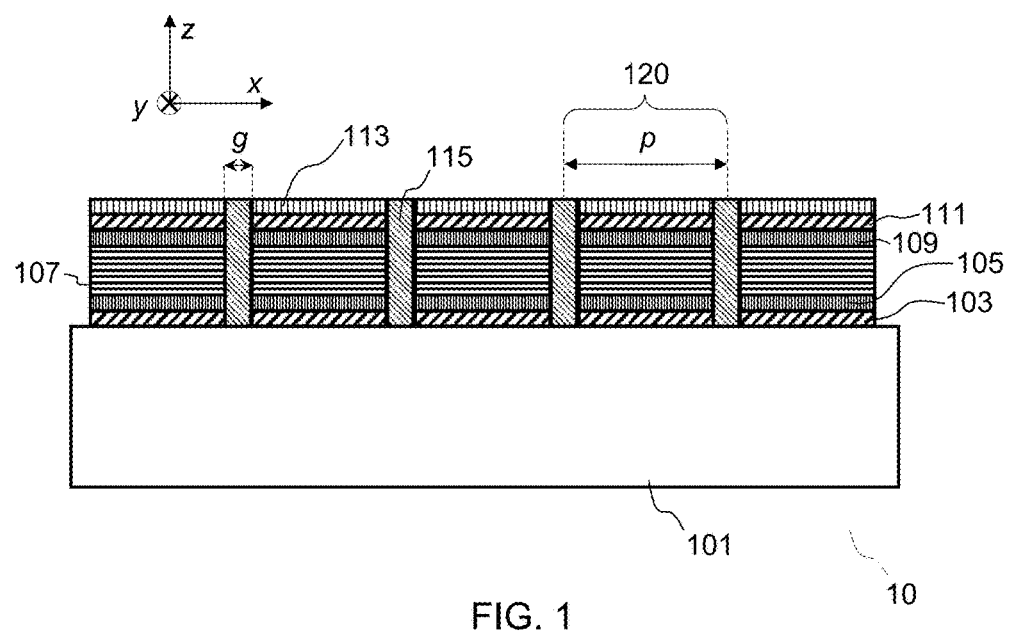
FIG. 1 is a 2D cross-sectional view of a photorefractive layer stack according to embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

A photorefractive response, which is the refractive index modulation in reaction to illumination with an optical pattern, can be enhanced significantly by distributing individual functional steps that together generate a photorefractive effect over a number of layers. Such layers are individually optimized for their corresponding functions. These functions may notably include: the optical absorption and carrier generation; the carrier separation and transport; the carrier storage; and the refractive index modulation via the electric field generated by the stored carriers.

A problem occurring in preexisting photorefractive layer stacks arises due to the lateral carrier diffusion that occurs in the trapping layers or along the boundaries between trapping layers and dielectric isolation layers. The lateral carrier diffusion, in turns, leads to a leveling of short-period gratings and limits the resolution of the photorefractive layer stack.

Methods commonly used to reduce lateral diffusion and improve the grating resolution rely on:

Low temperature growth of trapping layers to decrease conductivity and increase local trapping;

Annealing of low temperature grown trapping layers;

Proton implantation;

Impurity doping; and

Self-assembled quantum dots as trapping zones.

These methods all have in common that they can reduce the conductivity of the trapping layer material, but only up to a certain extent, and that grating leveling still occurs for grating periods below a few micrometers.

Aspects of the present disclosure prevent grating leveling. This is achieved by structuring the photorefractive layer stack, so as to prevent long-range, lateral carrier diffusion (in-plane). Because the vertical layer structure is still present, the structured material still functions as photorefractive layer stack. However, the electrical separation between the trapping areas prevents lateral carrier diffusion from one area to the other. As a result, high resolution gratings will not level out.

According to a first aspect, the present disclosure is embodied as a photorefractive layer stack, i.e., a device comprising layers of materials that are stacked along a given stacking direction. The layers are designed so as to enable a photorefractive response. That is, a modulation of a refractive index of the stack occurs in response to illuminating the stack with an optical pattern of modulated intensity, in operation. Interestingly, the stack is structured so as to form areas, which are dimensioned and distributed across a plane of the layer stack so as to be optically homogeneous. In addition, such areas are electrically insulated from each other, so as to prevent lateral carrier diffusion from one of the areas to the other. I.e., long-range diffusion in a plane perpendicular to the stacking direction is thus prevented.

The above design preserves the vertical layer structure, i.e., each area has a vertical layer structure, notwithstanding their separation. Thus, the structured stack still functions as a photorefractive device. However, the areas being electrically insulated from each other prevents lateral carrier diffusion from one area to the other. The limited, lateral carrier diffusion that results does not lead to a leveling of short-period gratings and the resolution of device can be markedly increased. For example, high resolution gratings will not level out or, at least, not in the same extent as with preexisting photorefractive devices.

In embodiments, the electrically insulated areas form a lattice. Such a lattice form a pattern of areas that repeat along one or two directions, respectively, in a plane perpendicular to the stacking direction. Providing a regular lattice of electrically insulated areas eases the fabrication of the layer stacks. For example, the areas may form a pattern of repeating columns, repeating squares, or randomized patterns.

The present disclosure may be designed to work with specific wavelength ranges. The average pitch between contiguous pairs of electrically insulated areas (as measured in a plane perpendicular to the stacking direction) can be made smaller than half the optical wavelength in the material. This can ensure that areas will appear homogeneous from an optical perspective, as discussed later in detail.

The characteristic dimension of the repeated area can be smaller than half the spatial period of said refractive index modulation, to prevent diffraction on the structuring pattern. However, in variants, diffraction can also be prevented by using randomized areas (a random lattice), where areas have distinct shapes and/or dimensions, so as for the resulting, distorted lattice to lack long-range order.

In some embodiments, the electrically insulated areas define portions of the layer stack, wherein each portion comprises a multiple quantum well structure. For example, in each portion, the multiple quantum well structure is formed by a multiple quantum well layer, sandwiched between carrier trapping layers, which are themselves sandwiched between dielectric isolation layers. The carrier trapping layers can be semiconductor layers.

In addition, the photorefractive layer stack may include outer electrodes arranged to encompass at least some of the dielectric isolation layers.

In some embodiments, the gap between any pair of contiguous ones of the electrically insulated areas extends inwardly from an outer surface of the layer stack, and at least to one of the carrier trapping layers, so as to interrupt the latter. This suffices to prevent lateral carrier diffusion.

However, in variants, this gap may extend beyond said one of the carrier trapping layers. It may for example extend through the entire layer stack, so as to form fully separated areas, which can ease the fabrication process.

In some instances, this gap is at least 10 nm, to prevent electrical shorts. Yet, the gap may be between 50 nm and 100 nm, to ease the fabrication process. The gaps can be filled with an electrically insulating material.

According to another aspect, the disclosure is embodied as an electro-optical device. The latter typically include a substrate, as well as a photorefractive layer stack such as described above, arranged on the substrate.

According to a final aspect, the invention is embodied as a method of operating a photorefractive layer stack such as described above, e.g., structured so as to form electrically insulated, optically homogeneous areas. The stack is illuminated with an optical pattern of modulated intensity to obtain a photorefractive response of the stack. That is, a modulation of the refractive index of the stack occurs in response to the optical pattern. Yet, lateral carrier diffusion from one of the areas to the other is prevented due to the electrically insulated areas.

The stack may possibly be illuminated laterally from a side of the stack (in a direction perpendicular to the stacking direction). Thus, the top electrode may not be transmissive to light.

Figure 2:
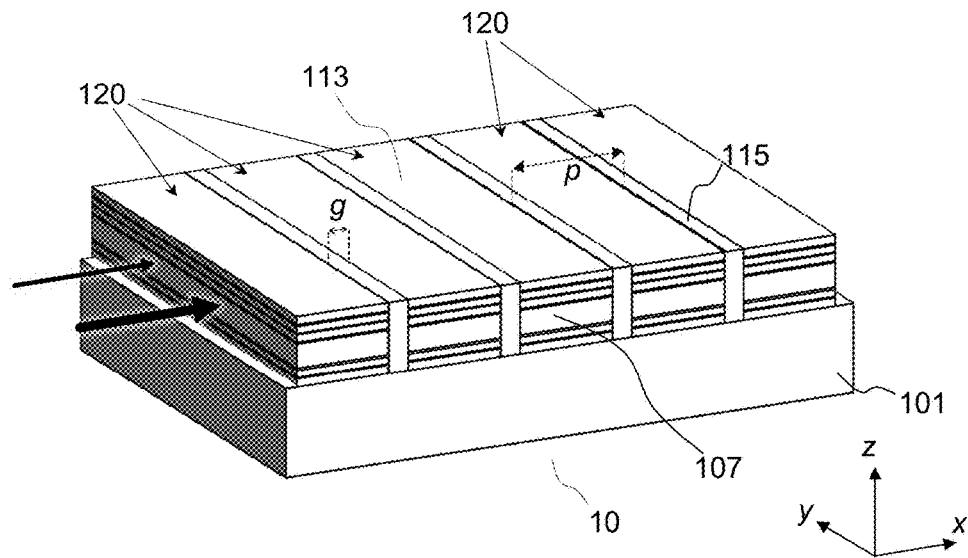
FIG. 2 is a 3D view of the photorefractive layer stack, in accordance with embodiments of the present disclosure.
Figure 3:
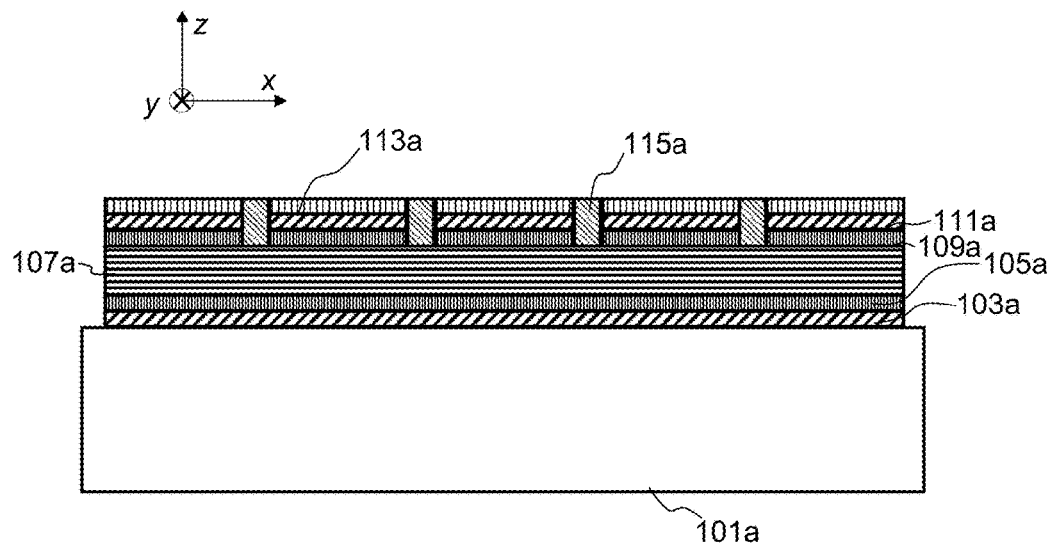
FIG. 3 is a 2D cross-sectional view of a variant of a photorefractive layer stack according to embodiments of the present disclosure.

In reference to FIGS. 1-3, aspects of the disclosure are described, which concern such a photorefractive layer stack 10, 10a. The stack comprises layers 103-113 (e.g., layers 103, 105, 107, 109, 111, and 113 of FIG. 1), 103-113a (e.g., layers 103a, 105a, 107a, 109a, 111a, and 113a of FIG. 3) of materials (semiconductor materials), which are stacked along a stacking direction z. This direction corresponds to the vertical direction in the accompanying drawings.

Figure 7:
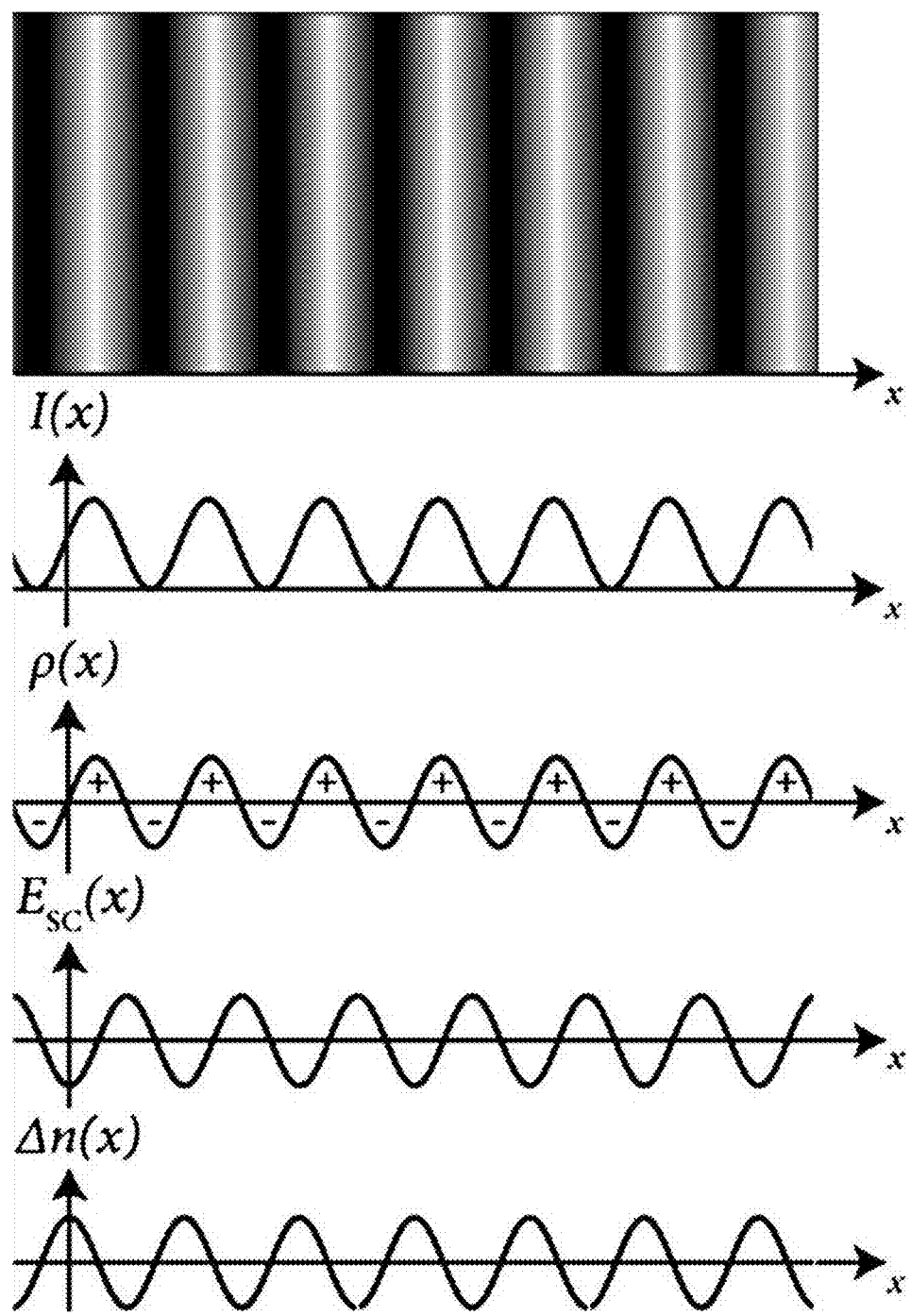
FIG. 7 depicts an optical interference pattern as can be formed on a photorefractive layer stack to enable a photorefractive response, whereby a modulation of a refractive index of the stack occurs in response to the interference pattern, as involved in embodiments. The underneath curves qualitatively depict corresponding profiles of key quantities, such as the intensity pattern, the charge density, the space-charge field, and the refractive index modulation, along axis x, in accordance with embodiments of the present disclosure.

As explained earlier, these layers 103-113, 103a-113a are designed so as to enable a photorefractive response, whereby a modulation of a refractive index of the stack occurs in response to illuminating the stack with an optical pattern of modulated intensity. The optical pattern may be an optical interference pattern, as exemplified in FIG. 7. This figure depicts a refractive index gratings as can be generated by illuminating a material by two coherent plane light waves under different angles. Due to interference, a periodic pattern of bright and dark stripes can be formed in the material, as depicted in FIG. 7, upper figure. In the bright areas, light is absorbed and excites charge carriers. The most mobile carriers (i.e., electrons) diffuse to the dark areas where they get trapped. Thus, in the dark areas an excess negative charge builds up, whereas in the bright areas an excess positive charge remains, as schematically depicted by the qualitative charge density profile $\rho(x)$ in FIG. 7. A space charge electric field Esc builds up between the regions with positive and negative charge. Thus the space charge electric field $Esc(x)$ along axis x points from bright (+) to dark (−) areas and has a positive extreme when the field points to the right (falling edge of $\rho(x)$) and a negative extreme when the field points to the left (rising edge of $\rho(x)$). The field pattern that results from the non-uniform charge distribution is, in turn, responsible for the refractive index modulation $\Delta n(x)$, owing to the electro-optic Pockels effect. The resulting refractive index grating has the same period as the optical interference pattern, but with a phase shift of pi/2, as seen in FIG. 7. The index modulation may depend linearly on the electric field, as assumed in FIG. 7. Thus the period of the refractive index modulation is the same as the period of the interference pattern in that case. A negative proportionality factor between was assumed in FIG. 7. However, in variants, this factor may be positive. In addition, and depending on actual properties of the materials at stake, the index modulation may possibly depend non-linearly on the electric field.

Interestingly, in the present approach the stack 10, 10a is further structured so as to form areas 121, 122, 123 (e.g., 121, 122, and 123 are possible variants of areas formed in insulating material 115). These areas are dimensioned and distributed in-plane, i.e., in a 2D space across a plane parallel to layers of the stack 10, 10a, i.e., parallel to (x, y). These areas are further dimensioned and distributed so as to be optically homogeneous. That is, the present photorefractive layer stacks comprise additional structures, which structures extend perpendicularly to the layers of the stack 10, 10a (i.e., parallel to direction z), so as to define areas 121, 122, 123.

In order for these areas to appear optically homogeneous, the pitch p, or the center-to-center distances between areas 121, 122, 123 may be subject to specific conditions, as discussed later in detail.

The resulting areas 121, 122, 123 are further electrically insulated from each other, so as to prevent lateral carrier diffusion from one of the areas to the other. As a result of the electrically insulated areas, the layer stack 10, 10a is non-conductive in-plane. Still, the additional, perpendicular structures needed to break the lateral carrier diffusion do not necessarily need to extend through the entire stack. Such structures may in fact simply interrupt outermost layers of the stack, as discussed later.

Notwithstanding the insulated areas, the vertical layer structure is preserved, such that the structured stack still functions as a photorefractive layer. However, the electrical separation between the trapping areas prevents lateral carrier diffusion from one area to the other, such that high resolution gratings can be achieved, which will not level out. That is, the insulated areas 121, 122, 123 prevent lateral carrier diffusion in the trapping layers or along the boundaries between the trapping layers and dielectric isolation layers. Without such insulated areas, carrier diffusion would lead to a leveling of short-period carrier density variations and limit the resolution of the photorefractive response, as evoked earlier.

Figure 4:
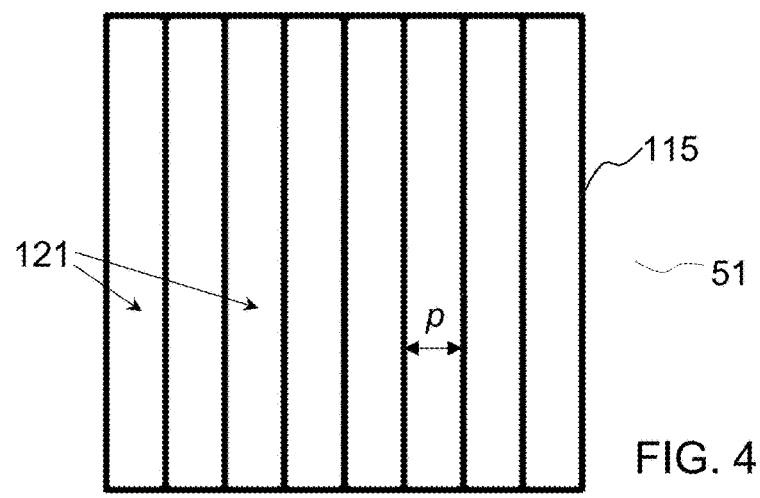
FIGS. 4-6 are top views of lattices that can be formed by insulated areas of photorefractive layer stacks, in accordance with embodiments of the present disclosure.
Figure 5:
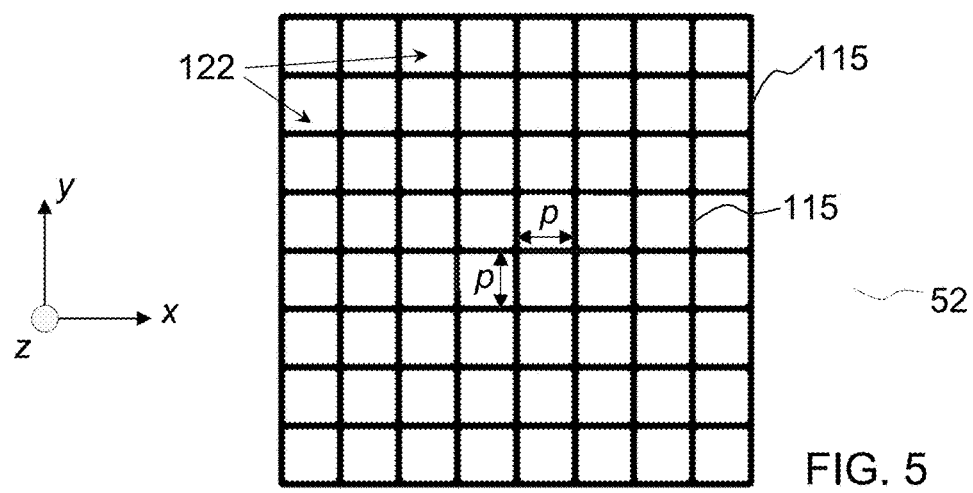
Figure 6:
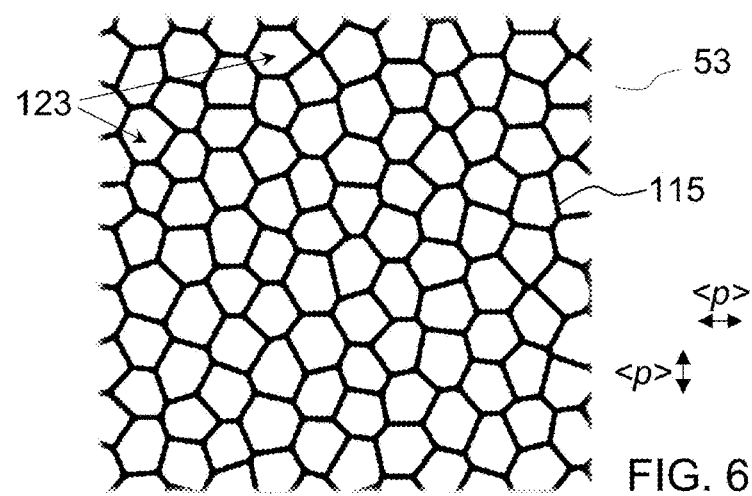

The insulated areas 121, 122, 123 form a regular or distorted lattice. For example, as illustrated in FIGS. 4-6 the insulated areas 121, 122, and 123 may form a 1D or 2D lattice 51, 52, and 53, respectively (e.g., a pattern of areas that repeat identically along one or two directions, in a plane parallel to (x, y), perpendicularly to the stacking direction z). In the embodiment depicted in FIG. 4, the electrically insulated areas 121 form a pattern 51 of repeating columns, whereas the embodiment depicted in FIG. 5, the areas 122 form a 2D lattice 52 of squares.

In each case, the areas 121 and 122 are insulated from each other. And in each case, the average pitch p between contiguous pairs of electrically insulated areas 121, 122 can be made smaller than half the so-called "optical wavelength in the material". The pitch p is measured in the lattice plane (e.g., a plane perpendicular to the stacking direction z). The pitch p corresponds to the lattice step (e.g., the center-to-center distance between pairs of contiguous areas 121). The terminology "optical wavelength in the material" refers to a known concept. This optical wavelength is given by the wavelength of light in vacuum divided by the effective refractive index of the material. Having a pitch p smaller than half this optical wavelength is a sufficient condition for the areas 121 and 122 to appear homogeneous from an optical perspective, according to effective-medium theory approximations.

In that respect, the wavelength range of interest here is in the optical range (i.e., 100 nm-1 mm, according to DIN 5031); the terminology radiation as used herein refers to electromagnetic radiation in the wavelength range between 100 nm and 1 mm. However, the wavelength range can, in most applications, be between 200 nm and 7.5 μm. In particular, wavelengths of 1.3 and 1.55 μm can be contemplated (and possibly 980 nm).

Now, irrespective of the optical wavelengths actually used to excite the layer stack, we note that the pitch p may possibly be made sufficient small, so as to be smaller than half the minimal optical wavelength in the material that can be achieved with optical wavelengths (of 100 nm at least). Yet, it is sufficient that the pitch p be made smaller than half the minimal optical wavelength in the material that can be achieved with the wavelength range meant for the photorefractive layer stacks.

In addition, and to prevent diffraction on the structuring pattern, the latter can have a periodicity that is below half the period of the optical grating patterns. In that respect, we note that the period of the photorefractive grating patterns strongly depends on the angle between the interfering writing beams and can, for the extreme case of contradirectional beams, be equal to half the optical wavelength in the material. Still, a slightly smaller structuring period is sufficient to prevent diffraction. Thus, in embodiments, a characteristic dimension of the repeated area 121, 122 is smaller than half the spatial period of the refractive index modulation enabled by the layer stack.

In variants to FIGS. 4 and 5, areas 123 may have distinct shapes and/or dimensions, so as to lack long-range order, as depicted in FIG. 6. For example, the areas 123 are randomized (and so the resulting 2D lattice is distorted), which, as it may be realized, can be exploited to prevent diffraction on the structuring pattern.

Referring back to FIGS. 1-3, the present photorefractive layer stacks 10, 10a can involve multiple quantum well (MQW) structures. That is, electrically insulated areas 120 define portions of the layer stack 10, 10a, wherein each portion comprises a multiple quantum well structure 107, 107a. Though electrically insulated areas 120 are only shown with respect to the embodiment in FIG. 2 (e.g., FIG. 2 is a 3D representation of the photorefractive layer stack of FIG. 1, in FIG. 3 the electrically insulated areas 120 are the areas in between insulating material 115.

Such MQW structures can be quite sophisticated, as known per se. For example, the MQW structure may for instance involve GaAs/AlGaAs or a GaInAs/GaInAsP compound. It may for instance be a Cr-doped GaAs/AlGaAs structure (e.g., a Cr☐doped GaAs/AlGaAs semi-insulating MQW photorefractive device) or a photorefractive p-i-n diode quantum well (e.g., a GaAsBi/GaAs multiple quantum well p-i-n diode).

More generally, the present devices may notably comprise III-V stacks of $In_{1-x-y}Al_xGa_yAs$ ($0 \leq x \leq 1$, $0 \leq y \leq 1-x$). Thus, a range of materials can be contemplated, including InAs, AlAs, InGaAs and InAlGaAs. In particular, InAs quantum dots can be contemplated when using a GaAs substrate. In variants, the III-V stack may comprise InGaAsP or InGaAsN. In general, the III-V stack may comprise a MQW section sandwiched between other III-V materials (for example InP or GaAs) lattice matched to the MQW section to prevent oxidation, as needed to start the growth of the core III-V stacked layers. The III-V stack may also comprise quantum dots sandwiched between quantum wells, as known per se. Such III-V stacks can be relatively easy to grow (e.g., by molecular beam epitaxy (MBE) or by metalorganic chemical vapor deposition (MOCVD)). The semiconductor materials can be doped, if sought, and can be in conjunction with strain (e.g., to tune the bandgap).

In embodiments such as depicted in FIGS. 1-3, the photorefractive layer stacks 10, 10a are partitioned into bulk portions corresponding to the insulated areas 120. In each portion, the MQW structure is formed as a MQW layer 107, 107a which is sandwiched between carrier trapping layers 105, 105a, and 109, 109a. The latter are themselves sandwiched between dielectric isolation layers 103, 103a, and 111, 111a. In addition, outer electrodes 113, 113a are provided, e.g., as layer portions, on top of the top isolation layer portions 111, 111a. The underlying substrate 101, 101a may play the role of a common electrode or be structured so as to provide lower electrodes (not shown) in contact with each portion 120. The top electrodes need not necessarily be transmissive to light, for reasons that will become apparent later. The carrier trapping layers 105, 105a, and 109, 109a can be made from semiconductor materials.

As seen in FIGS. 1-3, a gap g between contiguous areas 120 extends inwardly from the top surface of the layer stack 10, 10a, so as to define areas 120. Such gaps extend at least down to and through the upper carrier trapping layers 109, 109a so as to interrupt the latter. This way, lateral carrier diffusion is limited to single areas (intra-area diffusion). The gaps may stop at the level of carrier trapping layer 109a, as in FIG. 3. However, in variants, the gaps g may extend beyond the carrier trapping layer 109. They may for instance extend through the entire layer stack 10, as assumed in FIGS. 1 and 2, so as to form fully separated areas 120 (and corresponding portions), which makes can make it easier to fabricate.

The width of the gaps g between contiguous areas 120 can be at least 10 nm (as measured in-plane), to avoid electrical shorts. However, the width of the gaps g can be between 50 nm and 100 nm in practice, be it to ease the processing.

As further assumed in FIGS. 1-3, the gaps g can be filled with an electrically insulating material 115, although air gaps may, in more sophisticated embodiments, play the role of insulating structures.

Next, according to another aspect, the disclosure can be embodied as an electro-optical device comprising a photorefractive layer stack 10, 10a such as disclosed herein. This electro-optical device comprises a substrate 101, 101a on which the photorefractive layer stack 10, 10a is seated, as in FIGS. 1-3.

This electro-optical device may for example be a CMOS-fabricated silicon photonic chip, which includes the photorefractive layer stack. The latter may for instance be embedded in a back end of the line of the chip. In such cases, the photorefractive layer stack may be co-integrated, in the back end of the line of the silicon photonic chip, with one or more CMOS-fabricated integrated circuits. The CMOS-fabricated circuits may notably comprise transistors, e.g., configured for driving a light source (possibly integrated too) to excite the photorefractive layer stack.

Referring more specifically to FIG. 2, another aspect of the present disclosure is now described, which concerns a method of operating a photorefractive layer stack or an electro-optical device such as described above. As aspects of such a method have already been implicitly described in the description of the present devices, they are here only briefly discussed. Basically, such a method involves a photorefractive layer stack 10, 10a such as described earlier, i.e., structured so as to form electrically insulated, optically homogeneous areas 121, 122, 123. Then, according to the method, the stack 10, 10a is illuminated with an optical pattern of modulated intensity. This way, a photorefractive response is obtained, whereby a modulation of the refractive index of the stack occurs in response to said optical pattern. Yet, lateral carrier diffusion is prevented, owing to the electrically insulated areas 121, 122, 123.

In prior approaches, the photorefractive MQW structures can be designed to be illuminated from the top and thus require transparent electrodes on top. In the present case, however, one may want to illuminate the stacks from the side, with light propagating in a direction parallel to layers of the stack, such that transparent electrodes are not necessarily needed. That is, the stack 10, 10a may be laterally illuminated, with light propagating in a direction perpendicular to the stacking direction z.

While the present disclosure has been described with reference to a limited number of embodiments, variants and the accompanying drawings, it will be understood by those skilled in the art that various changes may be made and equivalents may be substituted without departing from the scope of the present disclosure. In particular, a feature (device-like or method-like) recited in a given embodiment, variant or shown in a drawing may be combined with or replace another feature in another embodiment, variant or drawing, without departing from the scope of the present disclosure. Various combinations of the features described in respect of any of the above embodiments or variants may accordingly be contemplated, that remain within the scope of the appended claims. In addition, many minor modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims. In addition, many other variants than explicitly touched above can be contemplated. For example, other materials than those explicitly cited may be contemplated.

What is claimed is:

1. A photorefractive layer stack, comprising:
   a plurality of layers stacked along a stacking direction, wherein a refractive index of the plurality of layers modulates in response to illuminating the plurality of layers with an optical pattern of modulated intensity; and
   a plurality of electrically insulated areas arranged in a plane perpendicular to the stacking direction; wherein the plurality of electrically insulated areas are optically homogenous and prevent lateral diffusion between any two electrically insulated areas of the plurality of electrically insulated areas.

2. The photorefractive layer stack according to claim 1, wherein:
   the plurality of electrically insulated areas include a 2D lattice pattern arranged on the plane perpendicular to the stacking direction.

3. The photorefractive layer stack according to claim 2, wherein:
   the 2D pattern includes a pitch, wherein the pitch is less than half an optical wavelength transmitted through the electrically insulated layers.

4. The photorefractive layer stack according to claim 2, wherein
   the 2D lattice pattern includes repeating columns.

5. The photorefractive layer stack according to claim 2, wherein:
   the 2D lattice pattern includes squares.

6. The photorefractive layer stack according to claim 2, wherein:
   a characteristic dimension of the 2D lattice pattern is smaller than half the spatial period of the refractive index modulation.

7. The photorefractive layer stack according to claim 1, wherein:
   said electrically insulated areas have distinct dimensions so as to lack long-range order.

8. The photorefractive layer stack according to claim 1, wherein:
   said electrically insulated areas define portions of the layer stack, wherein each of said portions comprises a multiple quantum well structure.

9. The photorefractive layer stack according to claim 8, wherein:
in each of said portions, the multiple quantum well structure is formed by a multiple quantum well layer sandwiched between carrier trapping layers, which themselves are sandwiched between dielectric isolation layers.

10. The photorefractive layer stack according to claim 9, wherein:
said carrier trapping layers are semiconductor carrier trapping layers.

11. The photorefractive layer stack according to claim 9, further comprising:
outer electrodes encompassing the dielectric isolation layers, wherein the outer electrodes are not transmissive to optical radiation.

12. The photorefractive layer stack according to claim 9, wherein:
a gap between electrically insulated areas extends inwardly from an outer surface of the layer stack through at least one of the carrier trapping layers.

13. The photorefractive layer stack according to claim 11, wherein:
the gap between said electrically insulated areas is at least 10 nm.

14. The photorefractive layer stack according to claim 11, wherein:
the gap between said electrically insulated areas is between 50 nm and 100 nm.

15. The photorefractive layer stack according to claim 11, wherein:
said gap extends inwardly beyond said one of the carrier trapping layers.

16. The photorefractive layer stack according to claim 13, wherein:
said gap extends inwardly through the entire layer stack, so as to form fully separated areas.

17. The photorefractive layer stack according to claim 1, wherein:
gaps between the electrically insulated areas are filled with an electrically insulating material.

18. An electro-optical device, comprising:
a substrate;
a plurality of layers stacked along a stacking direction disposed on the substrate, wherein a refractive index of the plurality of layers modulates in response to illuminating the plurality of layers with an optical pattern of modulated intensity; and
a plurality of electrically insulated areas arranged in a plane perpendicular to the stacking direction; wherein the plurality of electrically insulated areas are optically homogenous and prevent lateral diffusion between any two electrically insulated areas of the plurality of electrically insulated areas.

19. A method of operating a photorefractive layer stack, the method comprising:
providing a photorefractive layer stack with layers of materials stacked along a stacking direction, wherein the stack is structured so as to form areas, which are electrically insulated from each other and dimensioned and distributed across a plane of the layer stack so as to be optically homogeneous; and
illuminating the stack with an optical pattern of modulated intensity to obtain a photorefractive response of the stack, whereby a modulation of a refractive index of the stack occurs in response to said optical pattern, while lateral carrier diffusion is prevented due to the electrically insulated areas.

20. The method according to claim 19, wherein
illuminating the stack comprises illuminating the stack laterally from a side of the stack, in a direction perpendicular to the stacking direction.

* * * * *